Figure 1:
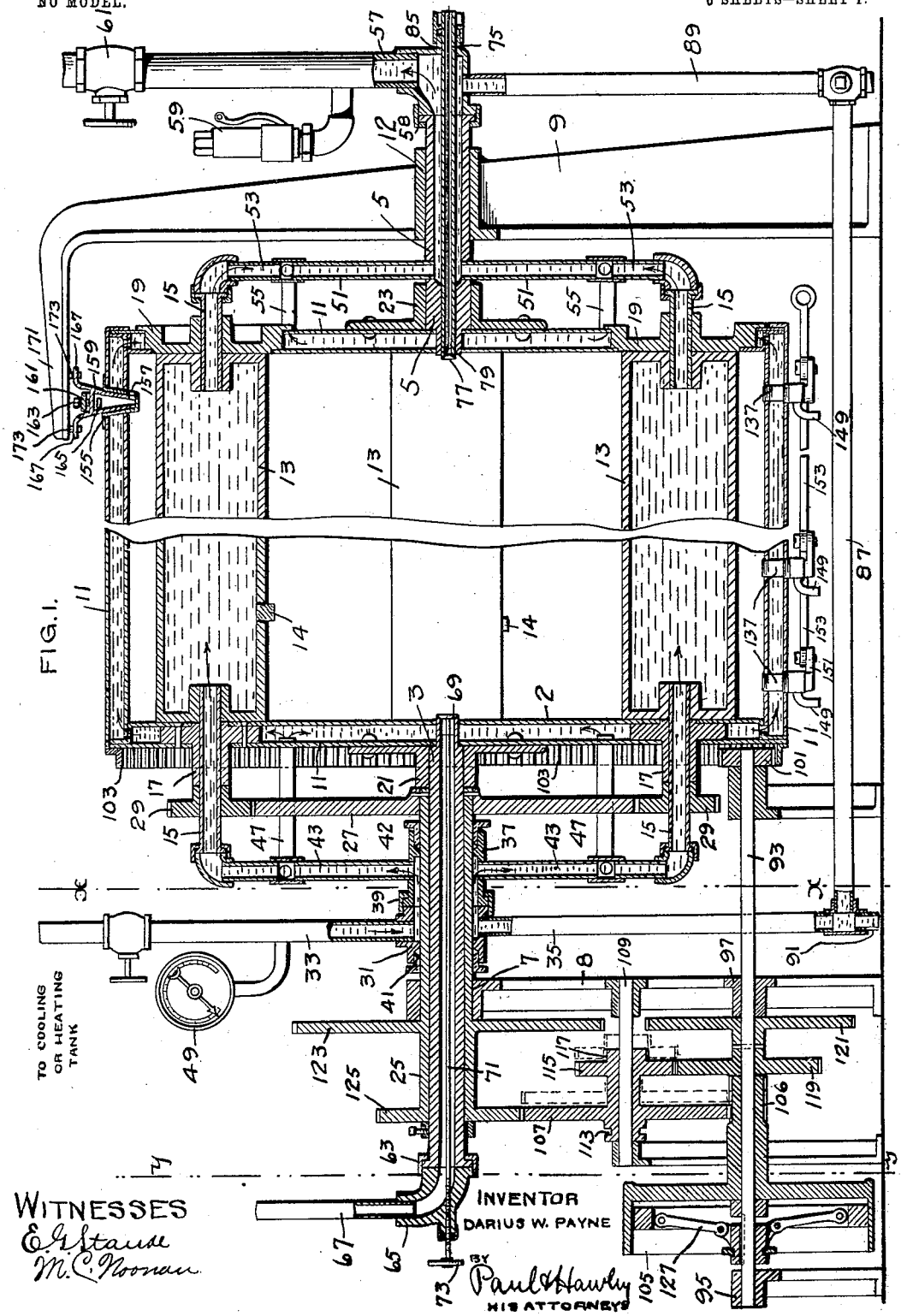

No. 722,886. PATENTED MAR. 17, 1903.
D. W. PAYNE.
COMBINED PASTEURIZER, CREAM RIPENER, CHURN, AND BUTTER WORKER.
APPLICATION FILED FEB. 15, 1901. RENEWED AUG. 4, 1902.
NO MODEL. 6 SHEETS—SHEET 1.

WITNESSES
INVENTOR
DARIUS W. PAYNE
BY
Paul & Hawley
HIS ATTORNEYS

No. 722,886. PATENTED MAR. 17, 1903.
D. W. PAYNE.
COMBINED PASTEURIZER, CREAM RIPENER, CHURN, AND BUTTER WORKER.
APPLICATION FILED FEB. 15, 1901. RENEWED AUG. 4, 1902.
NO MODEL. 6 SHEETS—SHEET 2.

WITNESSES.

INVENTOR
DARIUS W. PAYNE
BY
HIS ATTORNEYS

No. 722,886. PATENTED MAR. 17, 1903.
D. W. PAYNE.
COMBINED PASTEURIZER, CREAM RIPENER, CHURN, AND BUTTER WORKER.
APPLICATION FILED FEB. 15, 1901. RENEWED AUG. 4, 1902.
NO MODEL. 6 SHEETS—SHEET 3.

WITNESSES
E. G. Staude
M. C. Noonan

INVENTOR
DARIUS W. PAYNE
BY Paul & Hawley
HIS ATTORNEYS

No. 722,886. PATENTED MAR. 17, 1903.
D. W. PAYNE.
COMBINED PASTEURIZER, CREAM RIPENER, CHURN, AND BUTTER WORKER.
APPLICATION FILED FEB. 15, 1901. RENEWED AUG. 4, 1902.
NO MODEL. 6 SHEETS—SHEET 4.

WITNESSES
E. G. Stana
M. C. Noonan

INVENTOR
DARIUS W. PAYNE
BY Paul H. Hensley
HIS ATTORNEYS

No. 722,886. PATENTED MAR. 17, 1903.
D. W. PAYNE.
COMBINED PASTEURIZER, CREAM RIPENER, CHURN, AND BUTTER WORKER.
APPLICATION FILED FEB. 15, 1901. RENEWED AUG. 4, 1902.
NO MODEL. 6 SHEETS—SHEET 5.

WITNESSES
E. G. Staude
M. C. Noonan

INVENTOR
DARIUS W. PAYNE
BY Paul & Hawley
HIS ATTORNEYS

No. 722,886. PATENTED MAR. 17, 1903.
D. W. PAYNE.
COMBINED PASTEURIZER, CREAM RIPENER, CHURN, AND BUTTER WORKER.
APPLICATION FILED FEB. 15, 1901. RENEWED AUG. 4, 1902.
NO MODEL. 6 SHEETS—SHEET 6.
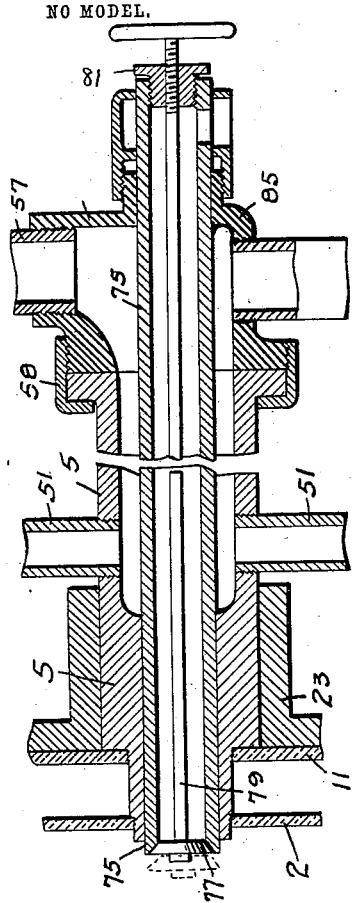
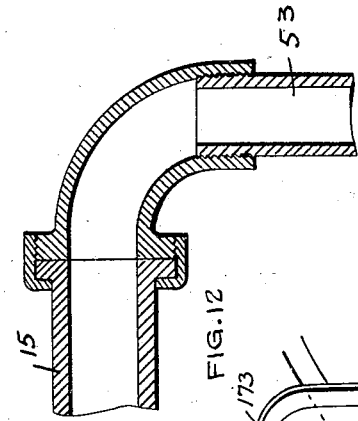
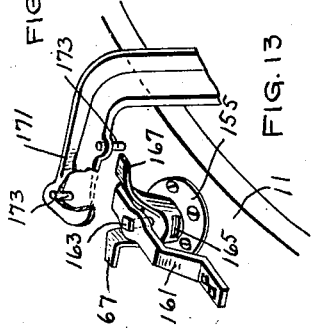
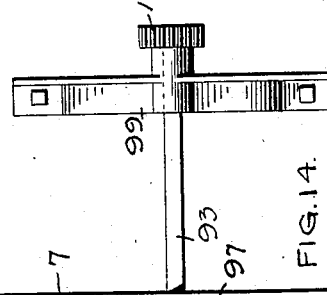
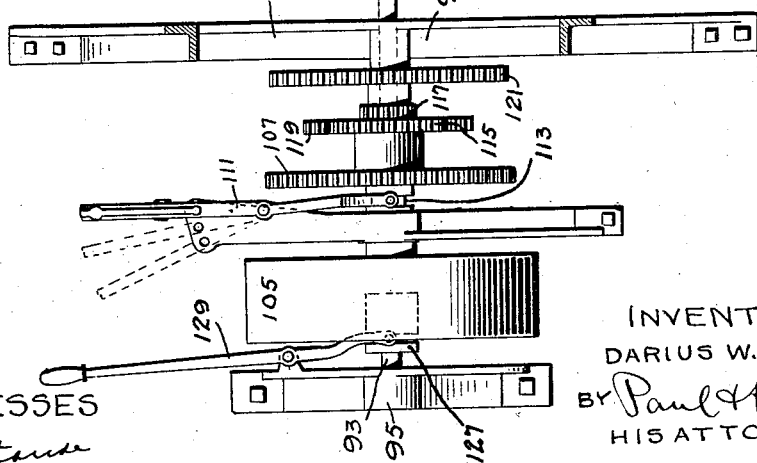
INVENTOR
DARIUS W. PAYNE
BY Paul & Hamly
HIS ATTORNEYS
WITNESSES

UNITED STATES PATENT OFFICE.

DARIUS W. PAYNE, OF MINNEAPOLIS, MINNESOTA.

COMBINED PASTEURIZER, CREAM-RIPENER, CHURN, AND BUTTER-WORKER.

SPECIFICATION forming part of Letters Patent No. 722,886, dated March 17, 1903.

Application filed February 15, 1901. Renewed August 4, 1902. Serial No. 118,348. (No model.)

*To all whom it may concern:*

Be it known that I, DARIUS W. PAYNE, of Minneapolis, in the county of Hennepin, State of Minnesota, have invented certain new and useful Improvements in a Combined Pasteurizer, Cream-Ripener, Churn, and Butter-Worker, of which the following is a specification.

This invention relates to improvements in machines designed for pasteurizing cream, ripening it, churning it, and thereafter salting and working the butter; and the objects I have in view are to provide a single machine in which these processes can be carried out. These processes are all carried out in one cylinder or receptacle, and the butter is finished and made ready for table use. I thereby dispense with the use of the usual cream-vat, pasteurizer, cream-ripener, and separate churn and butter-worker and combine the work of all of these machines into one machine, whose construction is as simple as that of the ordinary churn or butter-worker. This combined machine not only enables the work of several machines to be done in one, but produces a better article of butter, because the temperature of the cream is under the perfect control of the butter-maker while pasteurizing, ripening, and churning the cream into butter and because the cream and butter are kept in an air-tight receptacle during the different stages of the process. At the same time should the butter-maker desire not to make pasteurized butter the cream can be ripened and churned in the machine without pasteurizing by controlling the temperature and speed for the performance of each operation, and if for any reason the operator should desire this machine to perform the work of only one of the machines mentioned it will do it more perfectly than any one of the ordinary machines designed for such purposes alone, because in this machine the proper temperature can readily be attained.

The invention consists generally in providing a suitable jacketed drum or case mounted so as to be capable of rotation upon its axis and provided with means whereby steam or other gas or a suitable liquid may be circulated between the drum and its inclosing jacket while the machine is in operation.

The invention consists, further, in providing a suitable rotating drum with a series of hollow rolls, with means for circulating steam or other gas or a suitable liquid through said rolls while the machine is in operation.

The invention consists, further, in providing a suitable drum with a series of stationary hollow flights, with means for circulating steam or other gas or a suitable liquid through said flights while the machine is in operation.

The invention consists, further, in the constructions and combinations hereinafter described, and particularly pointed out in the claims.

Figure 2:
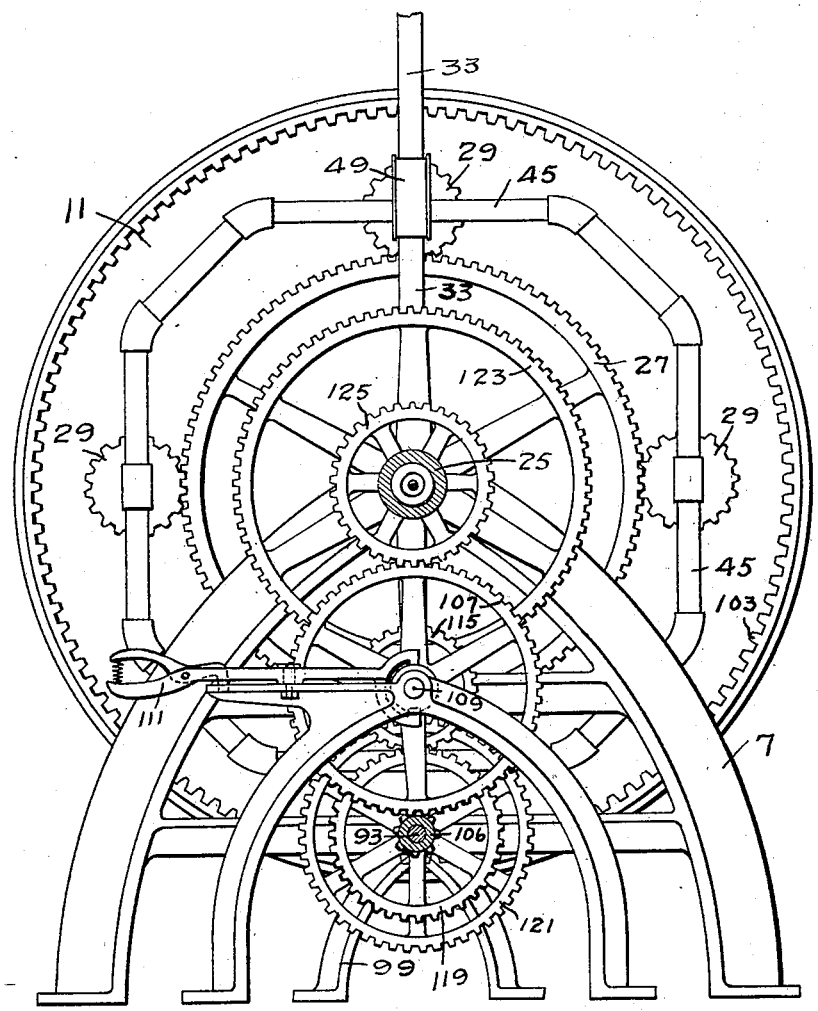
Figure 3:
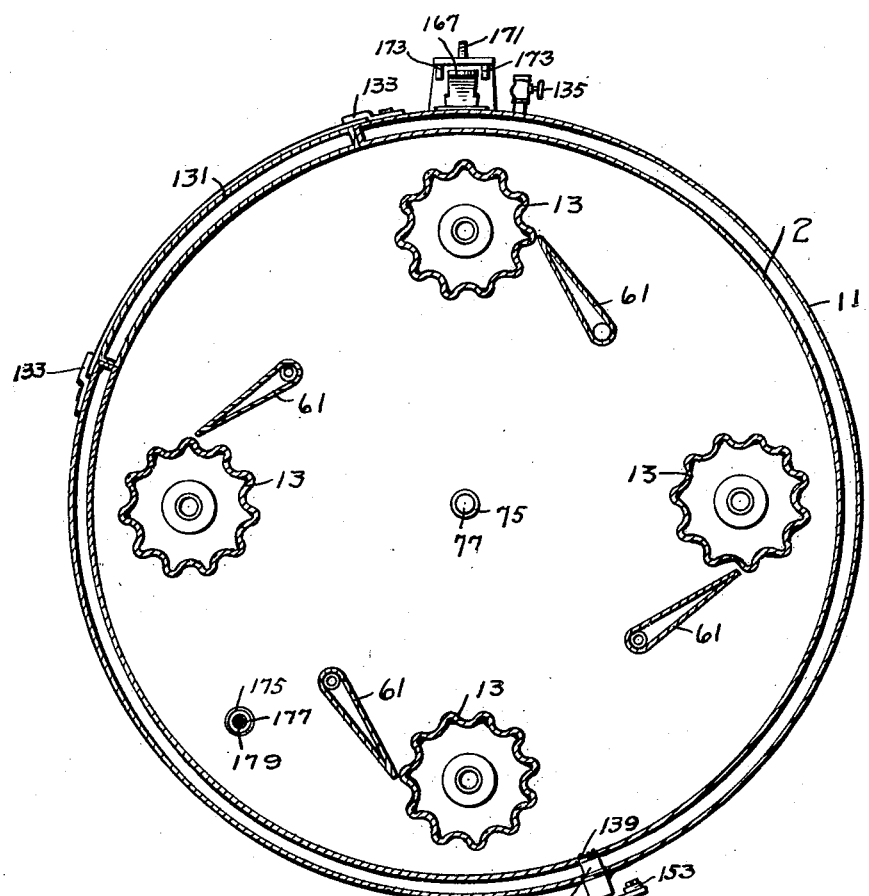
Figures 8, 9, 10:
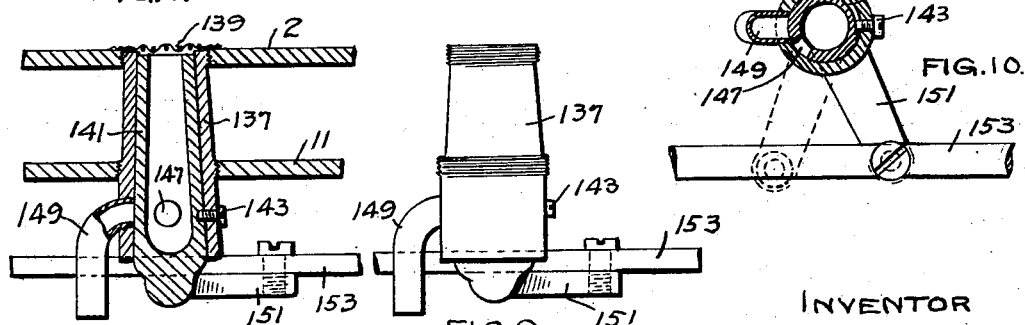
Figure 4:
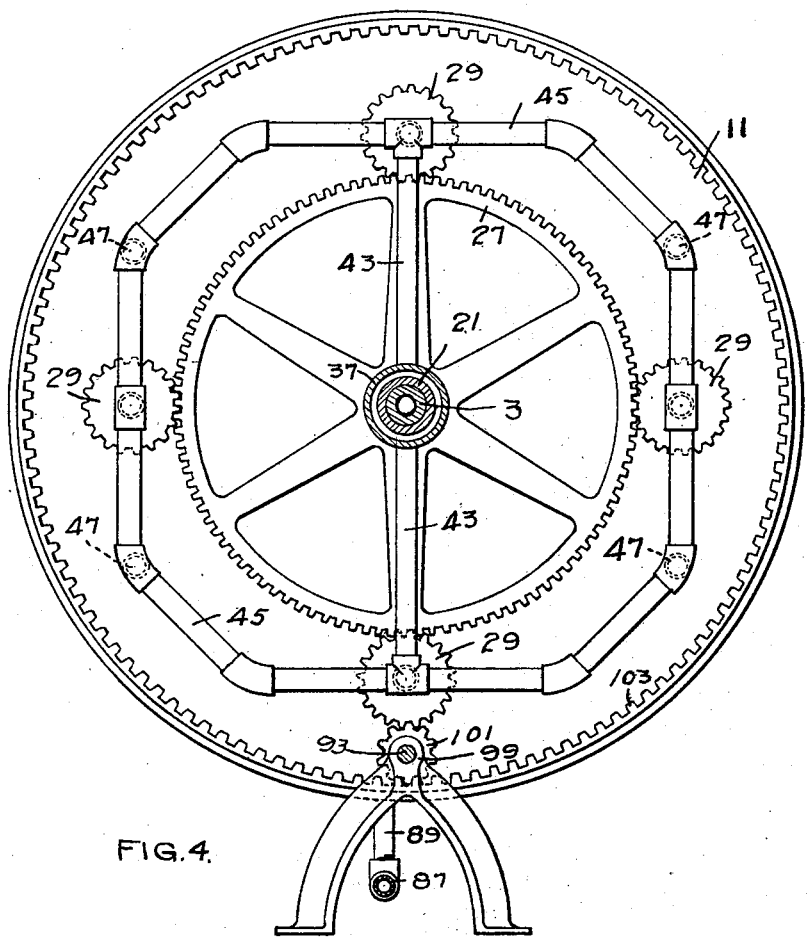
Figure 6:
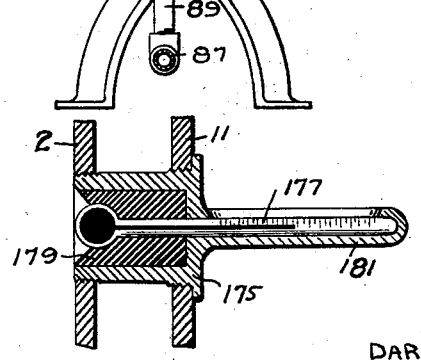
Figure 7:
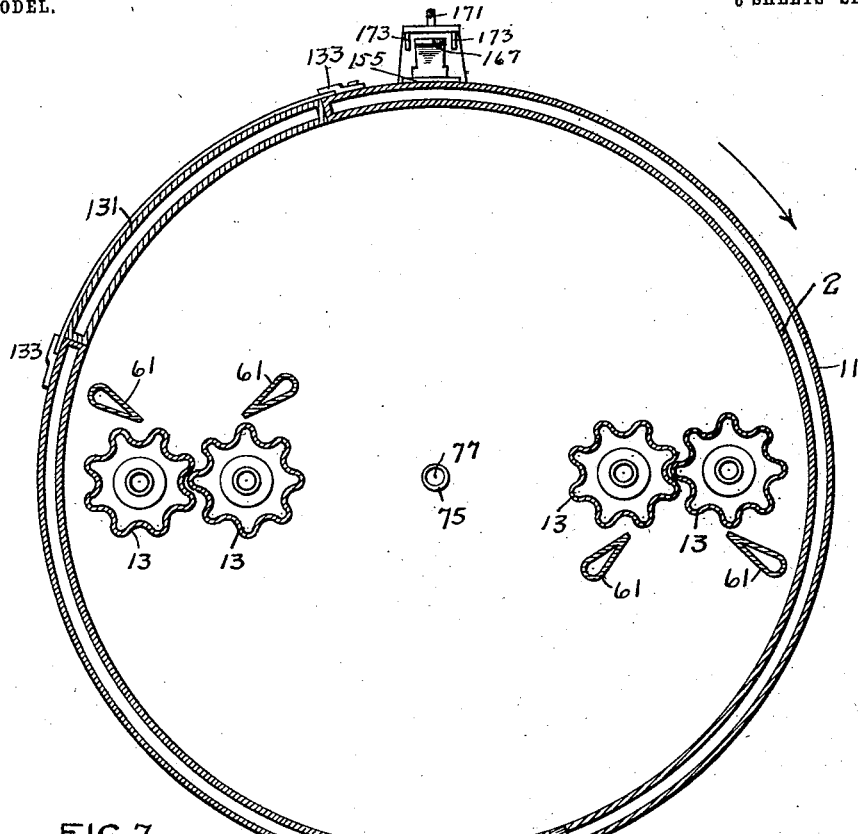
Figure 5:
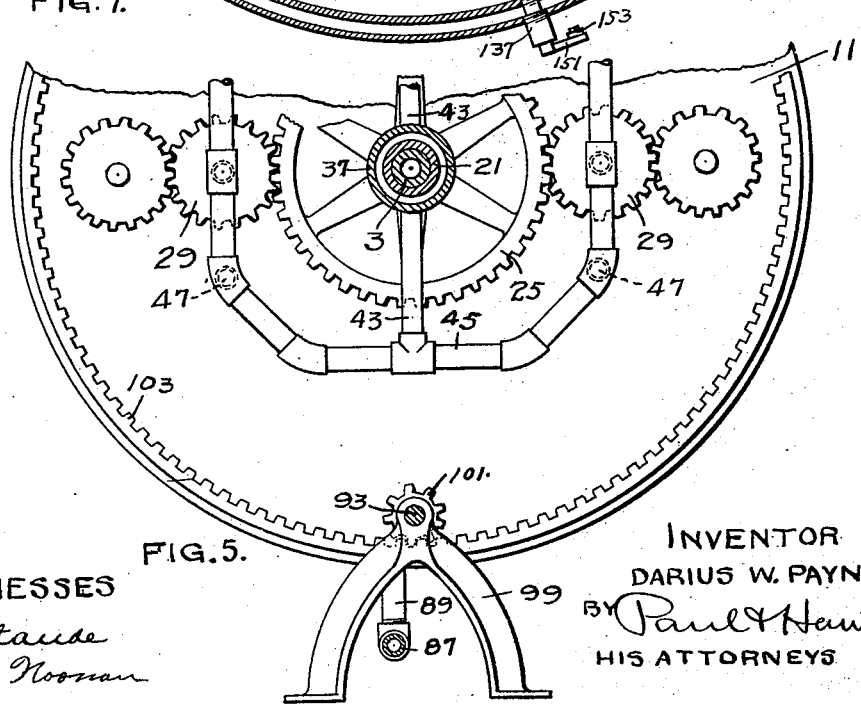

In the accompanying drawings, forming a part of this specification, Figure 1 is a longitudinal vertical section of a machine embodying my invention. Fig. 2 is an end elevation of the same on the line *y y* of Fig. 1. Fig. 3 is a transverse vertical section of the jacketed drum, showing also the rolls and flights arranged therein. Fig. 4 is a partial end elevation of the drum on the line *x x* of Fig. 1, showing the arrangement of the operating-gear and pipes in connection with the hollow rolls. Fig. 5 is a partial end elevation of a modified form, showing the arrangement of the gearing and the pipes that are connected with the other rolls. Fig. 6 is a detail showing the arrangement of the thermometer in the wall of the drum. Fig. 7 is a transverse section of the drum, showing a modified arrangement of the flights and hollow rolls. Figs. 8, 9, and 10 are details of the means for draining the drum. Fig. 11 is a longitudinal section of one of the drum-axles, showing means for passing steam or a suitable liquid into the drum. Fig. 12 is a detail of one of the pipe connections. Fig. 13 is a detail showing the automatic vent. Fig. 14 is a detail of the driving-gear.

In the drawings, 2 represents the drum or receptacle, which is made of any suitable size and shape. As here shown, the drum is provided with the hollow gudgeons or axles 3 and 5, which are mounted on suitable bearings 7 and 12, formed or supported upon the frames or legs 8 and 9. The drum 2 is preferably in the form of a cylinder, and it is constructed of any suitable material, preferably galvanized iron, copper covered with block-tin, or other material not liable to rust. The cylinder is provided with an outer jacket 11, and a space is thus formed between the drum and its surrounding jacket, through which steam, water, or any suitable gas or liquid may be circulated. Arranged within the drum are the corrugated hollow rolls 13. These rolls are mounted at each end upon a hollow pipe or gudgeon 15, extending through the end wall of the drum, and said gudgeons are capable of rotating in bearings 17 and 19, arranged in the end walls of the drum. The axle 3 is preferably secured to the drum by means of the flanged collar 21, and the axle 5 is secured to the other end of the drum by means of the flanged collar 23. Outside of the axle 3 is a second hollow axle or sleeve 25, which has secured to its inner end the large gear-wheel 27, and this gear-wheel meshes with the pinions 29 on the axles 15 of the rolls 13. Arranged outside of the hollow axle 25 is a stationary hollow sleeve 31, to which are connected the pipes 33 and 35. A sleeve 37 is also arranged outside of the hollow axle 25, and the space between the sleeve 37 and the outer surface of the hollow axle 25 forms a continuation of the space between the sleeve 31 and the outer surface of said axle. A collar 39 surrounds the sleeves 31 and 37 and forms a tight joint between them, the sleeve 31 being stationary and the sleeve 37 rotating with the drum. A stuffing-box 41 is arranged at the outer end of the sleeve 31, and a stuffing-box 42 is arranged at the outer end of the sleeve 37. Connected to the stationary sleeve 37 are the pipes 43. These pipes communicate with the pipe 45, that extends around the head of the drum, and are also connected to the ends of the hollow gudgeons 15. Suitable connections are also made from the pipe 43 by means of pipe 47 to the space between the cylinder and its jacket. (See Fig. 1.) As before stated, the pipe 33 communicates with the space within the stationary sleeve 31, as does also pipe 35. The pipe 33 is connected to any suitable reservoir or source of liquid-supply, and it is provided with a suitable pressure-gage 49. By the means already described steam, hot water, or other fluid or liquid may be caused to enter the interior of the rolls and the space between the cylinder and its jacket while the machine is in operation. I also provide means at the other end of the machine for removing the water, steam, or other liquid or fluid from the machine as soon as it has done its work, for which purpose the axle 5 is made hollow, and it is connected by pipes 51 to a suitable pipe 53, that is in turn connected to the hollow gudgeons 15 of the rolls 13. The pipes 53 are connected also to the pipes 55, which lead into the space between the cylinder and its jacket. The axle 5 is also connected by a suitable ring or collar 58 to a stationary pipe 57, provided with a suitable safety-valve 59 and a suitable hand-valve 61. As here shown, the fluid or liquid that enters through the pipe 33 passes into the space within the hollow rolls and also into the space between the inner cylinder and its jacket and passing through the jacketed space in the cylinder and through the rolls 13 heats the cylinder and the rolls to any desired temperature. The escaping liquid or fluid passes through the hollow axle 5 and into the pipe 57 and is conducted back to the reservoir or to any desired point.

I may employ the rolls 13 in pairs, as shown in Fig. 7 of the drawings, in which case the butter will be worked by its passage between the rolls, or I may employ single rolls, as shown in Fig. 3, in which case the butter will be worked by passing between each roll and the wall of the drum.

I also prefer to employ hollow flights or gather-boards 61, which extend lengthwise of the drum from one end to the other and which are connected with the jacketed space surrounding the drum, so that the fluid or liquid that is circulated through this jacketed space will circulate through the hollow flights. These flights may be arranged in pairs, as shown in Fig. 7 of the drawings, or where single rolls are used a single flight may also be employed in connection with each roll, as shown in Fig. 3.

The axle 3 is, as before stated, preferably made hollow, and it connects with the interior of the drum. The outer end of this axle is connected by a suitable stationary coupling 63 and an elbow 65 with a stationary pipe 67. The inner end of the axle 3 is provided with a flange 69, arranged upon the valve-stem 71, that passes through the hollow axle 3 and is provided with a threaded portion that extends through the threaded opening in the elbow 65. The valve-stem is also provided with an operating wheel or handle 73. By turning the valve-stem the valve 69 may be opened or closed. The opposite end of the drum is provided with a suitable pipe 75, that extends through the hollow axle 5 and communicates with the interior of the drum, and this pipe is also provided with a suitable valve 77 and valve-stem 79. (See Fig. 11.) The outer end of the pipe 75 is provided with the threaded plug 81, through which the valve-stem 79 passes, having a screw-threaded connection therein. A sleeve 85 surrounds the outer part of the pipe 75, and it is connected to the coupling of the stationary pipe 57 and forms a tight joint between the pipe 75 and the pipe 57. I also prefer to provide the pipe 35, connected to the sleeve 31 and also connected by a pipe 87 with a pipe 89, that in turn connects with the lower end of the pipe 57. A suitable valve may also be provided between the pipes 87 and 89. The lower end of the pipe 35 is provided with a nipple 91, to which a suitable hose or steam-pipe may be connected. When the rolls in the jacketed space are filled with water, a jet of steam may be injected through the nipple 91 into pipe 87, and this will cause a circulation of the liquid through the pipes and the rolls, the flights, and the jacketed space surrounding the drum.

For the purpose of rotating the drum and driving the rolls when it is desired to work the butter I provide a suitable driving-gear, by means of which the drum may be rotated at any desired speed and by means of which the rolls may also be rotated at a high or low speed. For this purpose I provide the driving-shaft 93, mounted in suitable bearings 95, 97, and 99 and provided with a pinion 101, (see Fig. 14,) that engages the internal ring-gear 103, arranged upon the end of the drum. Loosely mounted upon the shaft 93 is a driving-pulley 105. Formed integrally with said pulley is a pinion 106, having a long face to admit shifting of the gear that is in mesh therewith. This gear 107 is mounted so as to turn loosely upon a short shaft 109, mounted in suitable stationary bearings, and this gear is provided with a suitable shifter 111, that engages a groove 113 in the hub of the gear. Connected to or formed integrally with the gear 107 is a small gear 115 and a pinion 117. A gear 119 is mounted upon the shaft 93 and is secured thereto, and this gear is in mesh with the gear 115 when the gear 107 is in the position shown by full lines in Fig. 1. A gear 121, of larger diameter than the gear 119, is also secured to the shaft 93. When the gear 107 is shifted from the position shown by full lines in Fig. 1 to the position shown by dotted lines in the same figure, the gear 115 is disconnected from the gear 119. By further shifting the gear 107 the pinion 117 can be brought into mesh with gear 121 and with a large gear 123 on the sleeve 25. The sleeve 25 is also provided with a smaller gear 125, and when the gear 107 is in the position shown by the full lines in Fig. 1 it will be in mesh with the gear 125. As the gear 107 is shifted it disengages the gear 125, as indicated by the dotted lines in Fig. 1. A suitable clutch 127 is arranged on the shaft 93 and is adapted to be moved, so as to engage or disengage the pulley 105. A shifter-lever 129 (see Fig. 14) is provided in connection with the clutch 127, and by means of this shifter-lever the clutch may be engaged or disengaged from the pulley. The hub of the clutch 127 is connected with the shaft 93 by a suitable spline or feather, so that said clutch must turn with the shaft 93, while being free to slip longitudinally thereon.

The operation of the driving mechanism is as follows: When the clutch 127 is in engagement with the pulley 105, the shaft 93 will be driven directly from the pulley 105 and the cylinder will be rotated through engagement of the pinion 101 with the internal ring-gear 103 on the end of the cylinder. At the same time the gear 107 will be moved out of mesh with the gear 125 on the sleeve 25, and the sleeve 25 will, on account of the engagement of the pinions 29 on the axles of the rolls with the gear 27, turn with the drum, and the rolls while moving around with the drum will not be rotated on their own axes, but will remain stationary in relation to the head of the drum.

The drum may now be rotated at quite a high speed. This will be the operation when using the machine for churning. For working butter the clutch 127 will be disengaged from pulley 105 and the other parts will be arranged as shown in the drawings. The shaft 93 will now be driven through the pulley 105, pinion 106, the gear 107, gear 115, and the gear 119. The drum will be revolved by the engagement of the pinion 101 with the internal ring-gear on the end of the cylinder. The gear 107 also meshes in the gear 125, which in turn drives the gear 27 through the sleeve 25. The rolls will be revolved on their own axes by reason of the engagement of the pinions 29 with the large gear 27. For ripening cream the shifter 111 is operated to bring the pinion 117 into mesh with the gears 121 and 123, the clutch 127 is disengaged from the pulley 105, and the pinion 106 now drives the gear 107. The shaft 93 will be driven through the pinion 117 and the gear 121. The hollow axle 25 will be driven from the pinion 117 through the gear 123, and the drum and rolls will be rotated very slowly. By the means described the cylinder may be rotated rapidly for churning, while the rolls remain stationary on their axes, or the cylinder and rolls may be driven at moderate speed for working butter, or the cylinder and rolls may be driven very slowly for use in ripening the cream. Of course if preferred to rotate the rolls on their axes while churning this may be accomplished by holding the sleeve 25 in a stationary position, which will cause the rolls to be rotated on their axes through engagement of the pinion 29 with the stationary gear 27.

If preferred, the driving-pulley 105 may be located in connection with the central shaft or at any point between the central shaft and the pinion that engages the internal ring-gear on the end of the drum. I do not, therefore, confine myself to locating the pulley 105, as shown, on the shaft 93. Any other suitable location therefor may be provided, if preferred. If, however, the pulley 105 is differently located, some modification of the gearings may be necessary to secure the results that are obtained with the arrangement of gearing illustrated.

I am enabled through the mechanism described to drive the drum at three different rates of speed—a fast speed for churning, a slower speed for working butter, and a very slow speed for ripening the cream.

I also prefer to provide the drum with one or more suitable doors 131, as shown in Figs. 3 and 7. These doors are preferably made hollow, as shown in the drawings, and they may be provided with suitable fasteners 133 or may be hinged to the body of the drum or secured in any suitable manner. I have not shown in the drawings any provision for causing the liquid to circulate through the hollow doors and do not consider it necessary to make such provision, although, if preferred, a suitable arrangement may be provided permitting liquid to circulate through the door, as well as through the space between the drum and the jacket. I also prefer to provide a suitable valve 135, arranged in the jacket, preferably at a point near the door, so that said valve will be near the top of the drum when the drum is in the position shown in Fig. 7 of the drawings. When it is desired to fill the space between the drum and the jacket with liquid, the valve 135 may be opened, which will permit the air to escape from this space. As the liquid flows in the valve may be left open until the liquid overflows through this valve, when it may be closed. All the space between the jacket and the outer surface of the drum will then be entirely filled with liquid. When it is desired to remove the liquid from the space between the jacket and the drum, the drum may be turned so as to bring this valve 135 to the lowest point, permitting the liquid to escape through the valve.

I also prefer to provide a series of valves for draining the buttermilk or other milk from the interior of the drum. Any suitable construction or device may be used for this purpose. I prefer, however, to use the drain-cocks shown in Figs. 1, 3, and 7 of the drawings, as shown in detail in Figs. 8, 9, and 10. As here shown, there are three of these drain-cocks arranged in the wall of the drum. Any preferred number may, however, be used. As here shown, each cock consists of a suitable shell 137, that extends through the jacket and the wall of the drum. (See Fig. 8.) This shell may be secured in position by any suitable means. I have here shown it provided with suitable screw-threads by means of which it may be screwed into the walls of the jacket and drum. A suitable wire screen 139 is preferably arranged over the inner end of the shell. Rotatable hollow cock 141 is arranged in this shell, being held in place by the screw 143, that engages a slot 145 in the outer surface of the cock. A hole 147 is provided in the wall of the cock, and a short tube 149 is arranged in connection with the shell 137. The cock is provided at its lower end with a suitable projection or handle or arm 151, and a suitable operating-rod 153 is preferably connected to all of the arms 151. This rod extends to the end of the drum, and by means of this rod the operator can simultaneously open or close all of the drain-cocks. By having a series of drain-cocks at different points along the end of the cylinder I am able to readily and effectually drain all of the buttermilk from the drum, even though there may be a large amount of butter in the drum.

I also prefer to provide an automatic vent which will permit the gases to escape from the drum while the machine is in operation. Any preferred construction of automatic vent may be employed. The vent that I prefer to use is shown in Figs. 1, 3, and 7 of the drawings and is illustrated in detail in Fig. 13. As here shown, the drum is provided with a shell 155, which passes through the wall of the drum and through the jacket and is provided at its inner end with a vent-opening 157. Arranged within this shell is a rotatable hollow valve-body 159, which is provided with a vent-opening adapted to register with the opening 157 when the valve-body is in the position shown in Fig. 1 of the drawings. By giving the valve-body a partial rotation upon its axis its vent is moved away from the vent-opening 157, and the wall of the valve-body will then close the vent-opening 157. The valve-body is held in position in the shell by means of the bridge or strap 161 (see Fig. 13) and a suitable adjusting-screw 163, which passes through the strap 161 and bears upon the top of the valve-body. A vent-opening 165 is provided at or near the top of the valve-body, as shown in Fig. 13. The valve-body is also provided with two arms 167. A suitable stationary arm or bracket 171 extends partially over the drum and is provided with the pins 173. These pins are so located that at each revolution of the drum one of the arms 167 strikes one of the pins 173, which causes the valve-body to be given a partial rotation upon its axis, bringing the vent-openings into coincidence and permitting a portion of the gases in the drum to escape into the outer air. A further movement of the drum causes the other arm of the vent to be brought into contact with the other pin 173, and the valve-body is then reversed and the vent is closed. By this means the vent is opened at each revolution of the drum, thereby permitting the gases to escape.

I also prefer to provide in connection with the drum a suitable thermometer, the bulb of which is arranged to be in contact with the cream or milk in the inside of the drum and the stem and scale of the thermometer projecting outside of the drum. I have shown a suitable construction for securing the thermometer in position in Fig. 6 of the drawings. As here shown, a suitable bushing 175 is screwed through the wall of the jacket and drum, and a thermometer 177 is secured in this bushing, and the inner portion thereof is surrounded by a suitable cork or other packing 179. The stem of the thermometer is exposed outside of the drum, being protected by extension 181 on the bushing, and the lower portion of the bulb of the thermometer is exposed to contact with the milk or cream within the drum. By means of this thermometer the temperature of the milk or cream within the drum will be shown at all times. This thermometer is essential in ripening cream and pasteurizing it and in getting the proper temperature of the cream for churning.

If preferred, each of the rolls 13 may be provided with a suitable opening, and a plug 14, (see Fig. 1,) by means of which all of the water may be drained out from the rolls.

The machine should be thoroughly sterilized each time before cream or milk is put into it. In order to sterilize the machine, open the valve 69 and 77. Then pour into the drum a few gallons of clear water, either hot or cold. Close the doors, so that the drum will be tight. Operate the friction-clutch so as to connect the pulley 105 with the shaft 93 and revolve the drum. The space between the jacket and the drum and within the hollow rolls and flights should be filled with water, and steam is then injected through the nipple 91. This steam quickly heats the water, and the water within the drum will be highly heated and steam will be generated therein. This steam will pass out through the vent around the valve 77, and the action of the steam upon the inside of the drum will thoroughly cleanse the surface of the drum and completely sterilize it. If necessary, live steam may be admitted directly to the interior of the drum through the hollow shaft 3. For pasteurizing skim-milk the milk may be allowed to flow into the drum through one hollow axle and out through the other, and it may at the same time be subjected to the action of steam admitted directly into the drum through the hollow rolls or through any other suitable connection. By removing the liquid from the hollow rolls and connections and removing the plug 14 steam may be admitted to the inside of the drum through the rolls. After thoroughly sterilizing the machine the clutch is thrown out of operation and the water is drawn off from the drum through its drain. Then turn off the steam, close the valves 69 and 77, turn the drum so that the opening in the jacket will be at the highest point, and open the valve. Then let water flow into the space between the drum and the jacket, filling the jacket until it overflows. Then shut off the water, and close the vent or valve in the wall of the jacket. The cream or milk can now be poured into the cylinder through the covers, leaving plenty of room for the milk to expand when heated. Close the covers and turn on the steam through the nipple 91, but do not permit the steam to enter fast enough to blow or force the water from between the drum and jacket at the overflow. The steam is admitted in a jet, passing into and through pipes into the rolls, flights, and jackets, and circulates through the coils, coming back and upward again through the jacket, rolls, and flights. This steam causes a circulation of the water through the rolls and flights and through the space between the jacket and drum. The thermometer in the cylinder shows the degree of heat the cream or milk has attained, and a suitable thermometer may be located on the circulating-pipe to show the temperature of the steam. The agitation of the rolls and flights breaks the column of cream or milk, keeping it thoroughly mixed and preventing coagulation on the inner surface of the drum, and this, with the complete circulation of the hot water, causes the temperature of the milk or cream to rise uniformly throughout the machine, and while the heating and agitation is being conducted any impure air or gases are permitted to escape through the automatic vent from the interior of the drum. After the cream or milk is pasteurized and ripened it may then be churned and the butter worked in the machine. The butter may then be removed and packed, and the drum should then be rinsed with plenty of cold water. After this hot water may be used with plenty of soda or other suitable material for thoroughly cleansing it. The drum may then be rinsed with cold water, and then its inner surface may be sterilized by the use of steam or very hot water. After the water is removed from the rolls and flights and the space between the outer surface of the drum and the jacket steam may then be admitted, heating the rolls and the drum and causing the surfaces to dry quickly, thus preventing all chance of rusting. The covers and valves of the drum may be removed while the machine is drying.

It is preferable to use the live steam on the interior of the drum only for pasteurizing skim-milk. For pasteurizing milk or cream the live steam is not admitted to the interior of the drum, but only into the space between the outer surface of the drum and the jacket and into the hollow rolls and flights.

I claim as my invention—

1. The combination, in a machine of the class described, with a rotatable drum, of a series of hollow rolls arranged within said drum, means for rotating said rolls and means for passing liquid, steam, or other circulating medium, through said rolls, substantially as described.

2. The combination, in a machine of the class described, with a rotatable drum provided with a surrounding jacket, with a space between said drum and said jacket, of a series of hollow rolls arranged within said drum, means for rotating said rolls and means for passing liquid, steam, or other circulating medium, through the jacketed space surrounding said drum and through said hollow rolls, substantially as described.

3. The combination with a rotatable drum provided with a surrounding jacket, with a space between said drum and said jacket, of one or more hollow rolls arranged within said drum, means for rotating said rolls, one or more hollow flights or gather-boards also arranged within said drum, and means for circulating liquid, steam, or other medium, through the space surrounding said drum and through said rolls and flights, substantially as described.

4. The combination, with a rotatable drum provided with a series of hollow flights, and with a series of hollow rolls, means for rotating said rolls and means for circulating liquid, steam, or other medium, through said flights and rolls, substantially as described.

5. The combination, with a rotatable drum having hollow axles, and a jacket surrounding said drum and provided with a space between said jacket and said drum, of means for passing liquid, steam, or other medium through one of said hollow axles into the space surrounding said drum and removing it through the other axle, and suitable pipes connecting the exit from said drum with the inlet thereto, whereby a circulation of liquid, steam, or other medium through the space surrounding said drum may be maintained, substantially as described.

6. The combination in a machine of the class described, with a rotatable drum, of the series of hollow rolls arranged in said drum, hollow gudgeons upon which said rolls are mounted, pipes connected to said gudgeons, means for rotating said rolls and means for passing liquid, steam, or other circulating medium through said rolls, substantially as described.

7. The combination with a rotatable drum, of the series of hollow flights and the series of hollow rolls arranged therein, hollow gudgeons upon which said rolls are mounted, means for rotating said drum, means for rotating said rolls, and means for passing liquid, steam, or other circulating medium, through said rolls, drum and flights, substantially as described.

8. The combination with a rotatable drum provided with the axles 3 and 5, of the stationary sleeve 31 and the rotatable sleeve 37 surrounding the axle 3, the pipe 35 connected to said stationary sleeve, pipes 43 connected to said sleeve 37, a series of hollow rolls arranged within said drum and provided with hollow gudgeons, and means for connecting said pipes 43 with said hollow gudgeons, substantially as described.

9. The combination with a suitable drum, of the shell 155 passing through the wall of said drum, provided with a vent-opening 157, the rotatable valve-body 159 arranged in said shell, and means for turning said valve-body partially on its axis at each revolution of the drum.

10. The combination, with a suitable drum, of a series of hollow rolls supported in said drum, means for supporting and rotating said drum, means for causing said rolls to rotate on their axes or to remain stationary while being carried around with said drum, and means for passing a suitable liquid, steam, or other circulating medium through said hollow rolls, substantially as described.

11. The combination, with a suitable drum, of a series of hollow rolls 13 mounted therein, means for rotatably supporting said drum, means for rotating said drum, and means for causing said rolls to rotate on their axes or to remain stationary while the drum is in operation, and means for varying the speed of revolution of either the rolls or the drum, substantially as described.

12. The combination, with a suitable drum, of the hollow axles supporting said drum and suitable valves for closing the openings through said axles, said valves being provided with means for moving them in the direction of the length of said axles, substantially as described.

13. The combination with a rotatable drum formed of inner and outer cylinders or casings arranged with a space between them, said drum being provided with a hollow gudgeon, gudgeon inlet and outlet openings communicating with the space between said casings, hollow rolls arranged within said drum and provided with hollow journals communicating with the space between said inner and outer casing whereby air, steam, water, or other fluid may be circulated through said hollow rolls.

In witness whereof I have hereunto set my hand this 8th day of February, 1901.

DARIUS W. PAYNE.

In presence of—
A. C. PAUL,
M. C. NOONAN.